(12) United States Patent
Mourao

(10) Patent No.: US 7,757,915 B2
(45) Date of Patent: Jul. 20, 2010

(54) ACCESSORY ADAPTER FOR MOTORIZED PERSONAL TRANSPORTER

(76) Inventor: Emilio Mourao, 168 Sherry St., Woodridge, NJ (US) 07095

( * ) Notice: Subject to any disclaimer, the term of this patent is extended or adjusted under 35 U.S.C. 154(b) by 839 days.

(21) Appl. No.: 11/702,007

(22) Filed: Feb. 2, 2007

(65) Prior Publication Data
US 2007/0205241 A1 Sep. 6, 2007

Related U.S. Application Data

(60) Provisional application No. 60/765,340, filed on Feb. 3, 2006.

(51) Int. Cl.
*B60R 9/00* (2006.01)
(52) U.S. Cl. .................. 224/401; 224/422; 224/555; 280/769
(58) Field of Classification Search ............. 224/401, 224/908, 422, 429, 424, 419, 447, 545, 555, 224/42.11; 280/762, 769, 727, 47.3, 47.32; 180/218, 21, 7.1; 396/419
See application file for complete search history.

(56) References Cited

U.S. PATENT DOCUMENTS

| | | | | |
|---|---|---|---|---|
| 5,341,971 | A | * | 8/1994 | Newbold et al. ............ 224/422 |
| 5,501,482 | A | * | 3/1996 | McClive ..................... 280/503 |
| 5,701,965 | A | | 12/1997 | Kamen et al. |
| 5,971,091 | A | | 10/1999 | Kamen et al. |
| 6,302,230 | B1 | | 10/2001 | Kamen et al. |
| 6,367,817 | B1 | | 4/2002 | Kamen et al. |
| 6,408,240 | B1 | | 6/2002 | Morrell et al. |
| 6,561,294 | B1 | | 5/2003 | Kamen et al. |
| 6,575,539 | B2 | | 6/2003 | Reich |
| 6,581,714 | B1 | | 6/2003 | Kamen et al. |
| 6,598,941 | B2 | | 7/2003 | Field et al. |
| 6,651,766 | B2 | | 11/2003 | Kamen et al. |
| 6,779,621 | B2 | | 8/2004 | Kamen et al. |
| 6,789,640 | B1 | | 9/2004 | Arling et al. |
| 6,796,396 | B2 | | 9/2004 | Kamen et al. |
| 6,799,649 | B2 | | 10/2004 | Kamen et al. |
| 6,815,929 | B1 | | 11/2004 | Dagan et al. |
| 6,827,163 | B2 | | 12/2004 | Amsbury et al. |
| 6,945,441 | B2 | * | 9/2005 | Gates et al. ................. 224/401 |

OTHER PUBLICATIONS http://shop.segway.com/detail.aspx? ID=4 (2 pages).

* cited by examiner

*Primary Examiner*—Nathan J Newhouse
*Assistant Examiner*—Steven M Landolfi, Jr.
(74) *Attorney, Agent, or Firm*—Greenberg Traurig, LLP

(57) ABSTRACT

An accessory adapter for a motorized personal transporter, which includes a bracket, a support member attached to the bracket, and a bearing assembly. The bearing assembly is mounted on an outer wheel nut of a wheel of the transporter, while the bracket is attached to a wheel assembly of the transporter. An inner connecting member of the bracket is connected to an inner portion of the wheel assembly of the transporter, while an outer connecting member of the bracket engages the bearing assembly. The outer connecting member of the bracket includes a concave cavity in which the bearing assembly lies, thereby allowing the wheel of the transporter to spin freely and brace the weight of the accessory. The support member may include a pair of prongs, which are connected to the bracket, and a neck that contains a plurality of holes which enables a user to connect accessories to the adapter, such as video camera equipment, golf bags, hunting rifles, and other personal items.

2 Claims, 6 Drawing Sheets

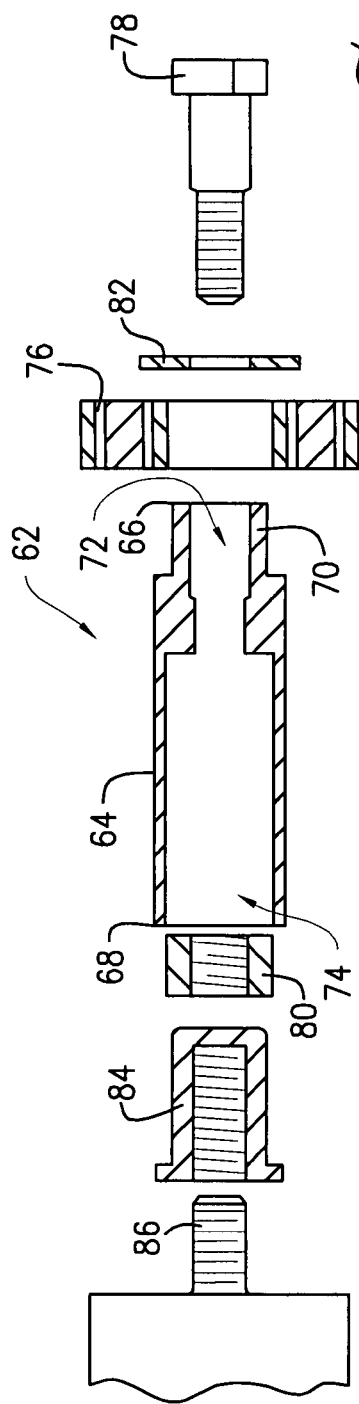
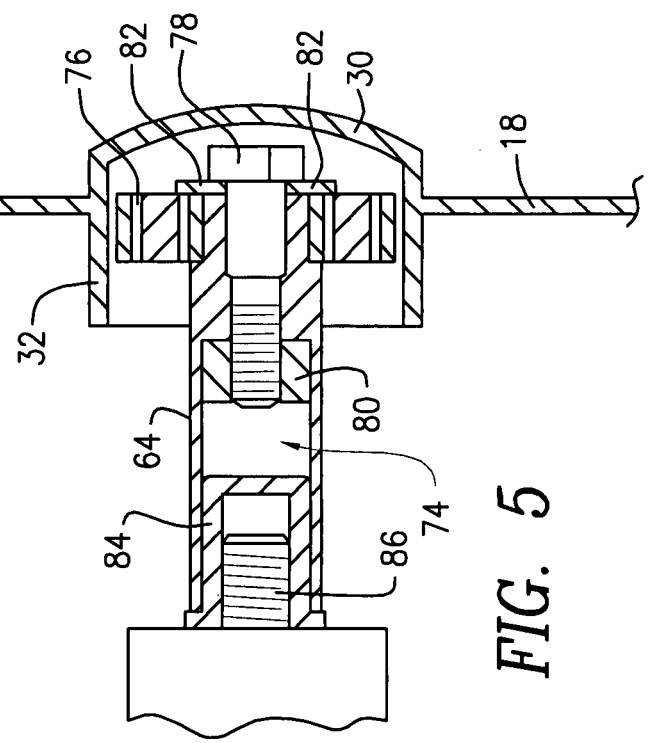
FIG. 4
FIG. 5

US 7,757,915 B2

ACCESSORY ADAPTER FOR MOTORIZED PERSONAL TRANSPORTER

CROSS-REFERENCE TO RELATED APPLICATION

This application claims the benefit under 35 U.S.C. § 119(e) of U.S. Provisional Application No. 60/765,340, filed on Feb. 3, 2006, which is incorporated herein by reference in its entirety for all purposes.

FIELD OF THE INVENTION

The present invention relates to an accessory adapter for use in connection with a motorized personal transporter.

BACKGROUND OF THE INVENTION

Motorized personal transporters are becoming popular in today's society, especially the SEGWAY® brand of personal transporters manufactured and sold by Segway, LLC. By way of background, the SEGWAY® personal transporter is a two-wheeled, motorized vehicle that self-balances itself and the user via gyroscopes, tilt sensors, microprocessors and motors that work in concert. The SEGWAY® personal transporter is the subject of U.S. Pat. Nos. 5,701,965; 5,971,091; 6,302,230; 6,367,817; 6,408,240; 6,561,294; 6,575,539; 6,581,714; 6,598,941; 6,651,766; 6,779,621; 6,789,640; 6,796,396; 6,799,649; 6,815,929; and 6,827,163 which are incorporated herein by reference.

Because the SEGWAY transporter is used primarily for personal transportation, it follows that the user would want the transporter to accommodate personal items and accessories. Segway manufactures and sells a cargo system for use in connection with the SEGWAY transporter. This cargo system consists of a curved crossbar having two ends, each of which are fastened to a corresponding inner wheel well of the transporter. The crossbar is adapted to receive a pair of saddle bags in which a user can store personal items. However, this cargo system has several disadvantages. For instance, the crossbar is positioned in the front of the transporter and, thus, impedes the user from dismounting from the front of the transporter (only in an emergency). In addition, the saddle bags are small and can only accommodate small and light personal items. In this regard, the cargo system is not adapted to receive large, heavy and bulky accessories. This limits the capabilities of the transporter. Accordingly, there is a need for an accessory adapter for personal transporters that overcomes the disadvantages associated with present cargo systems and which provides for the possibility of allowing for a multitude of attachments.

SUMMARY OF THE INVENTION

The present invention overcomes the disadvantages and shortcomings of the prior art discussed above by providing a new and improved accessory adapter for motorized personal transporters. The adapter includes a "U-shaped" bracket, a Y-shaped support member, and a bearing assembly. The bearing assembly is mounted on a wheel nut of a wheel of the transporter. The bracket is attached to the wheel assembly of the transporter. More particularly, an inner connecting member of the bracket is connected to an inner portion of the wheel assembly of the transporter, while an outer connecting member of the bracket engages the bearing assembly. In this regard, the outer connecting member of the bracket includes a concave cavity in which the bearing assembly lies, thereby allowing the wheel of the transporter to spin freely and brace the weight. The support member includes a pair of prongs, which are connected to the bracket, and a neck that contains a plurality of holes which enables a user to connect accessories to the adapter, such as video camera equipment, golf bags, hunting rifles, and other personal items.

Specifically, the present invention has been adapted for use in connection with the SEGWAY® brand of motorized personal transporters. However, the present invention can be adapted for use in connection with other brands of motorized personal transporters and/or other types of personal transporters. Further features and advantages of the invention will appear more clearly on a reading of the detailed description of the exemplary embodiments of the invention, which are given below by way of example only with reference to the accompanying drawings.

BRIEF DESCRIPTION OF THE DRAWINGS

For a more complete understanding of the present invention, reference is made to the following detailed description of the exemplary embodiments considered in conjunction with the accompanying drawings, in which:

FIG. 4 is an exploded cross-sectional view of a bearing assembly used in connection with the accessory adapter of FIG. 1;

FIG. 5 is a cross-sectional view of the bearing assembly of FIG. 4, the components of which are fully assembled and engaged with a wheel nut of a motorized personal transporter and the accessory adapter of FIG. 1;

DETAILED DESCRIPTION OF THE DRAWINGS

Figure 1:
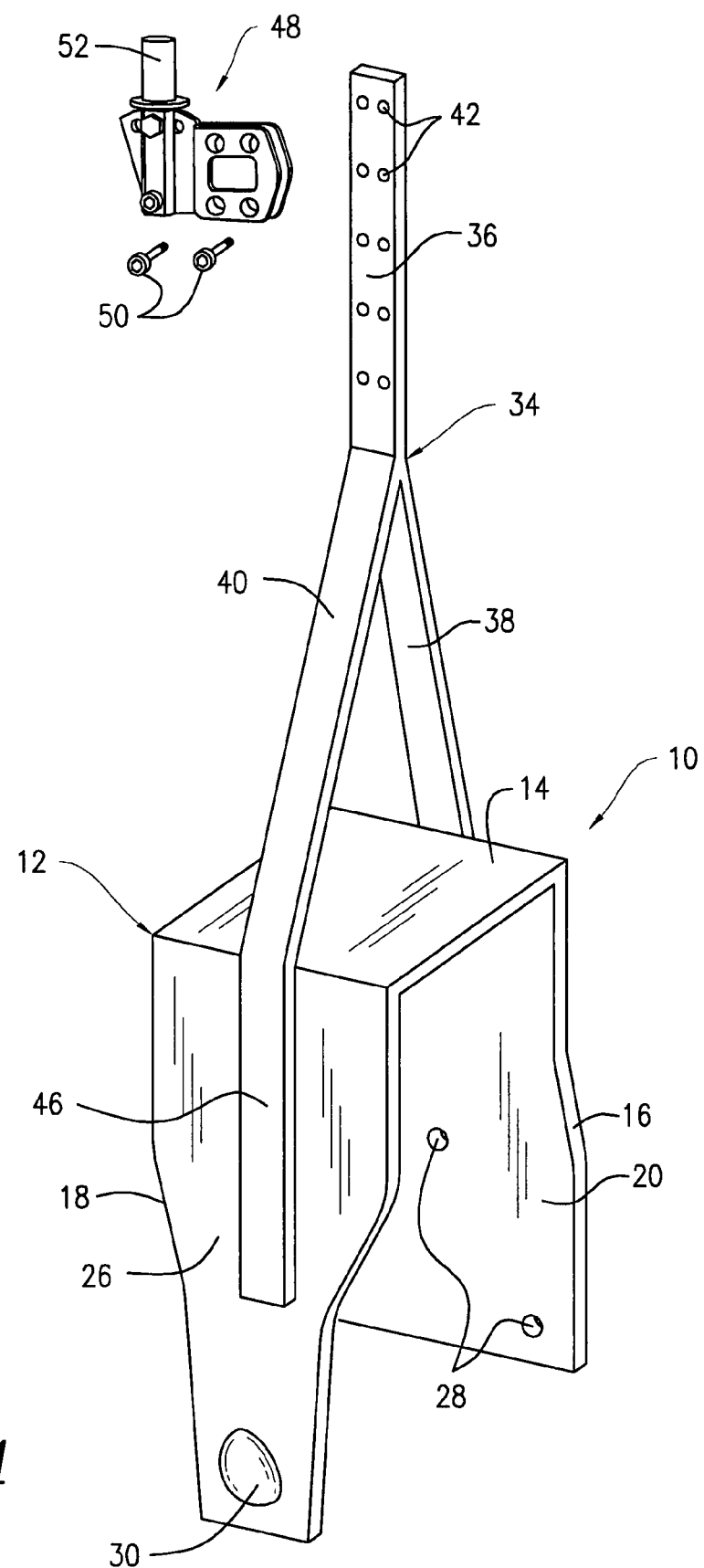
FIG. 1 is a front perspective view of an accessory adapter constructed in accordance with one exemplary embodiment of the present invention.
Figure 2:
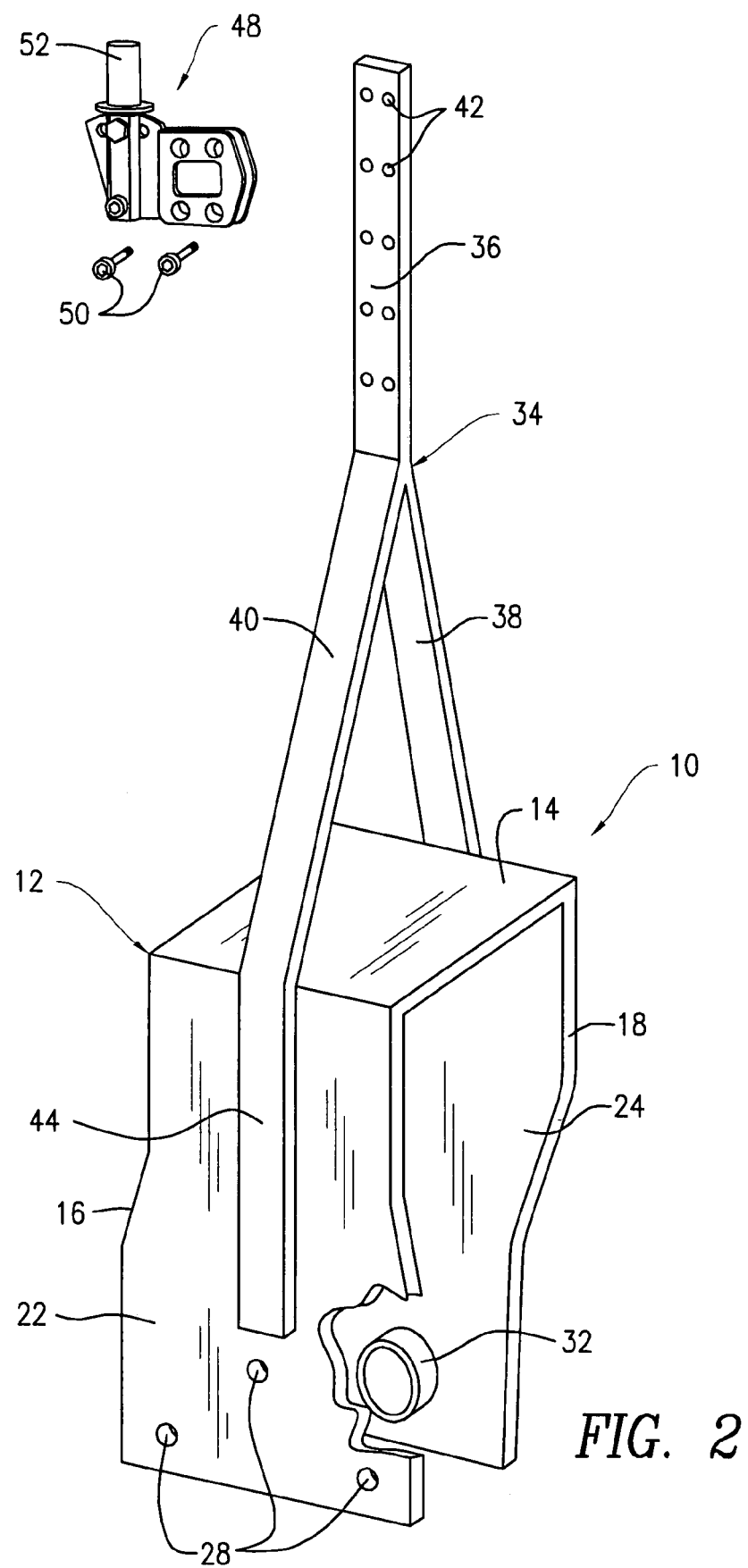
FIG. 2 is a rear perspective view of the accessory adapter of FIG. 1.

Referring to FIGS. 1 and 2, an accessory adapter 10 includes a bracket 12 having a square-shaped base 14 and a pair of connecting members 16, 18 that extend from the base 14 in a longitudinal direction and parallel to each other. The base 14 and the connecting members 16, 18 cooperate to form a U-shape. The connecting member 16 has an inboard side 20 (see FIG. 1) and an outboard side 22 opposite the inboard side 20 (see FIG. 2). Similarly, the connecting member 18 has an inboard side 24 (see FIG. 2) and an outboard side 26 opposite the inboard side 24 (see FIG. 1). The connecting member 16 includes a plurality of holes 28, each of which extend from the inboard side 20 to the outboard side 22 thereof. The holes 28 are arranged in a triangular pattern (see FIG. 2), the purpose of which shall be described hereinafter. The connecting member 18 includes circular-shaped, concave receptacle 30 formed within the inboard side 24 thereof (see FIG. 1) and a cylindrical-shaped well 32 that extends around the periphery of the receptacle 30 (see FIG. 2).

With continued reference to FIGS. 1 and 2, the accessory adapter 10 includes a support member 34 having an elongated neck 36 and a pair of prongs 38, 40 that extend outwardly from neck 36. The neck 36 and the prongs 38, 40 cooperate to form a Y-shape. The neck 36 includes a plurality of holes 42, whose purpose shall be described hereinafter. One end 44 of the prong 38 is connected to the outboard side 22 of the connecting member 16 (see FIG. 2), while one end 46 of the prong 40 is connected to the outboard side 26 of the connecting member 18 (see FIG. 1). The bracket 12 and the support member 34 are, preferably, connected to each other by welding, but they may be connected to each other by other attachment means, such as adhesives, bolts, rivet, screws and other fasteners. Alternatively, the bracket 12 and the support member 34 may be of unitary construction.

Still referring to FIGS. 1 and 2, the neck 36 of the support member 34 is adapted to receive a bracket 48, whose function shall be described hereinafter. The bracket 48 is connected to the neck 36 by a plurality of bolts 50 each of which are sized and shaped to engage one of the holes 42 of the neck 36, thereby securing the bracket 48 thereto. The bracket 48 may include an upwardly extending post 52, whose function shall be described hereinafter. Preferably, the adapter 10 includes the bracket 48, but the bracket 48 need not be included. Alternatively, the adapter 10 may includes other types of connecting means known in the art.

It is noteworthy that the bracket 12 and/or the support member 34 can consist of many different shapes and sizes, depending upon the specific application of the adapter 10. In addition, the adapter 10 is, preferably, manufactured from steel. Alternatively, the adapter 10 may be made from other materials, such as aluminum, plastic, etc.

Figure 3:
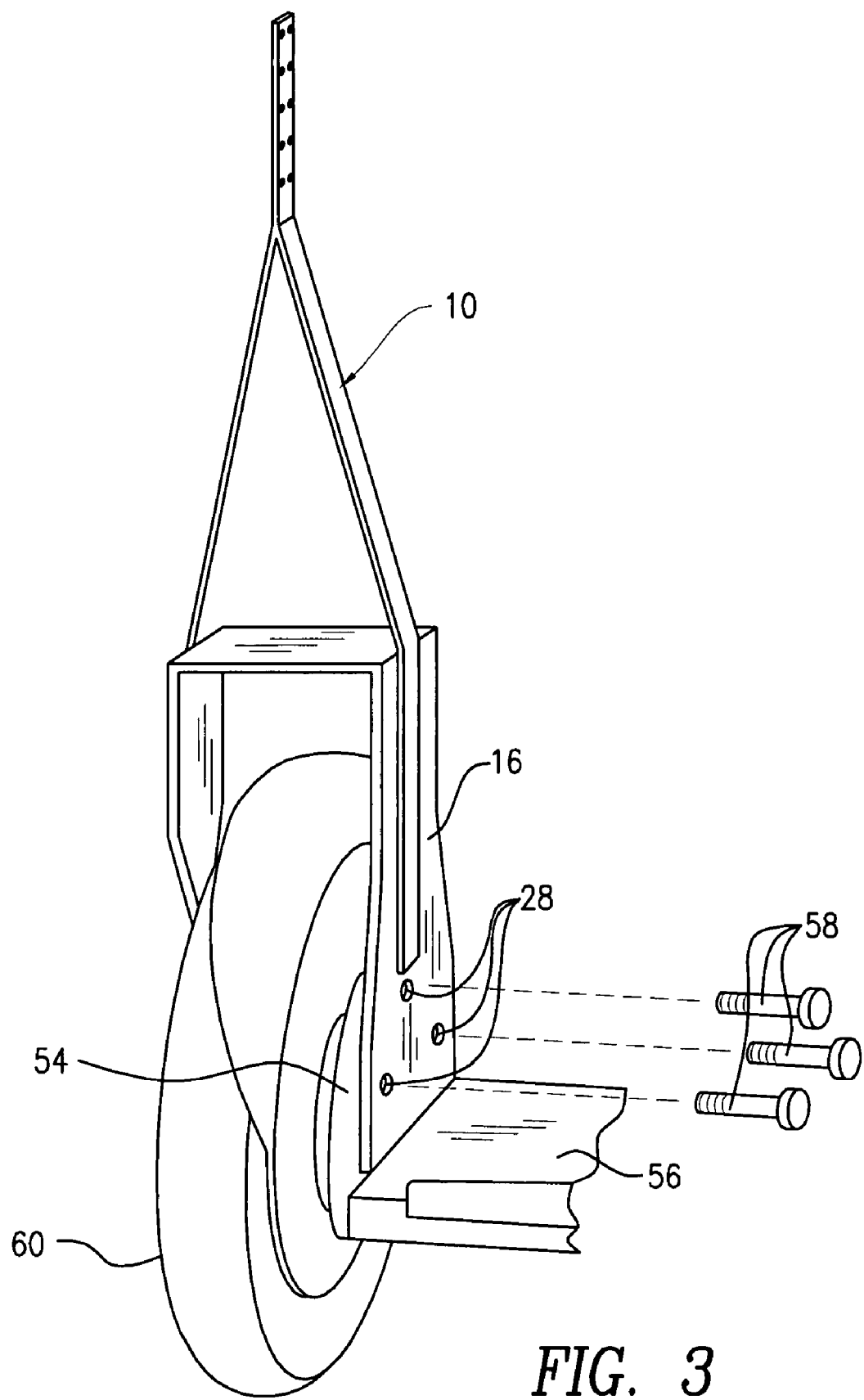
FIG. 3 is a front perspective view of the accessory adapter of FIG. 1 mounted to an associated motorized personal transporter that is partially shown.
Figure 6:
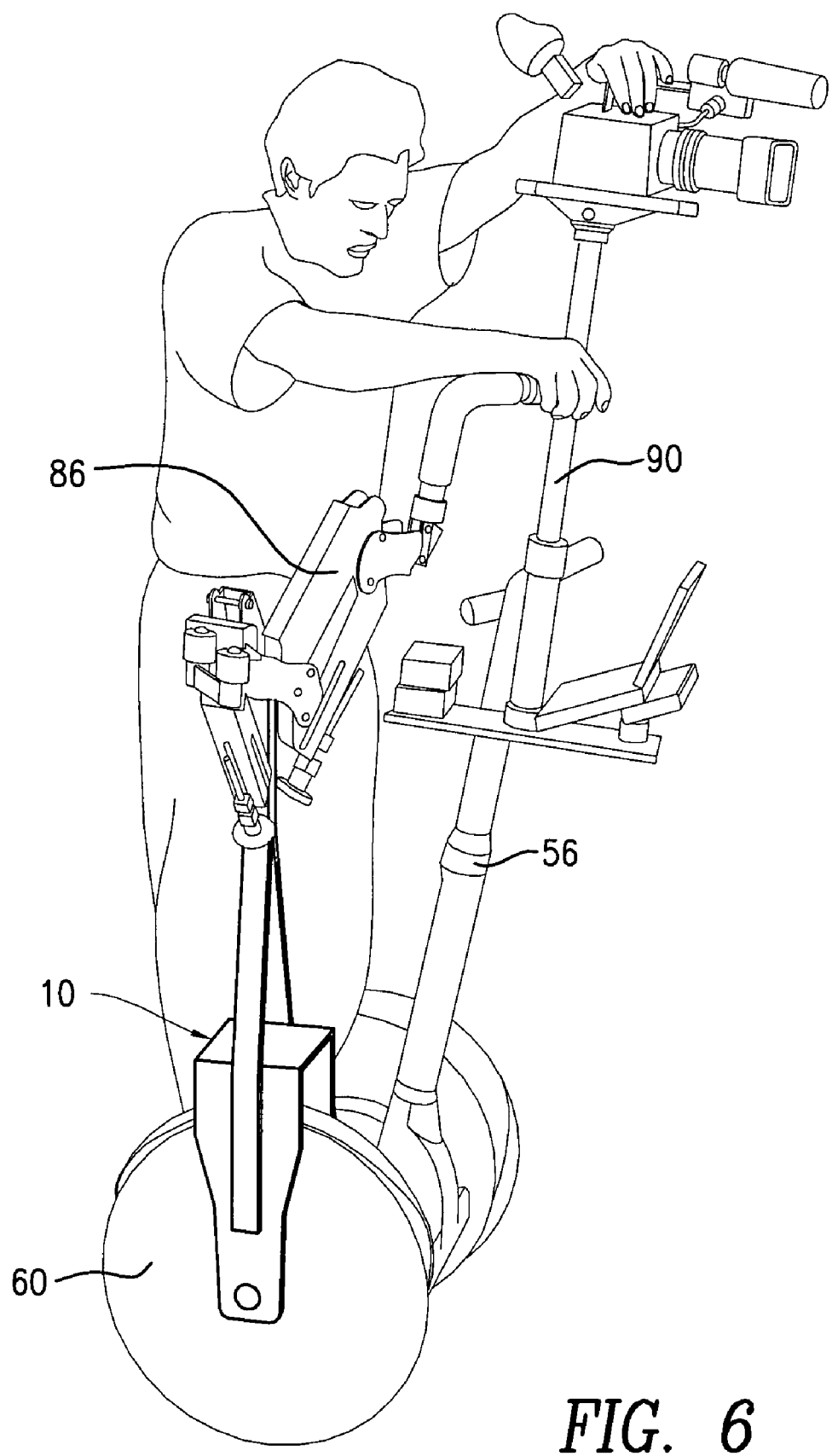
FIG. 6 is a perspective view of the accessory adapter of FIG. 1 mounted to an associated motorized personal transporter and engaged with accessory equipment.

Referring to FIGS. 3 and 6, the adapter 10 is sized and shaped to fit over a wheel assembly 54 of a personal transporter 56. The wheel assembly 54 includes a plurality of holes formed in a triangular pattern (not shown in the Figures). More particularly, the pattern of the holes 28 of the connecting member 16 corresponds with the pattern of the holes of the wheel assembly 54. The holes 28 of the connecting member 16 and the corresponding holes of the wheel assembly 54 are each adapted to receive a bolt 58 in order to ensure a firm connection of the adapter 10 to the transporter 56. It is noted that when the adapter 10 is secured to the transporter 56, there is ample clearance between the adapter 10 and a wheel 60 of the transporter 56 so as not impede rotation thereof.

Referring to FIGS. 4 and 5, the adapter 10 contains a bearing assembly 62 that includes cylindrical-shaped socket 64 having a first end 66 and a second end 68 opposite the first end 66. The first end 66 of the socket 64 includes a cylindrical-shaped shaft 70 having an square-shaped aperture 72 formed therein, while the second end 68 of the socket 64 includes a hexagonal-shaped cavity 74 formed therein. A ring-shaped sealed bearing 76 is mounted on the shaft 70 of the socket 64 by a bolt 78 and a corresponding locknut 80 and washer 82. As shown in FIG. 5, the bolt 78 is positioned within the aperture 72 of the socket 64 and the locknut 80 is positioned within the cavity 74 of the socket 64 when the bearing assembly 62 is fully assembled. The bearing 76 is, preferably, a sealed, cylindrical roller bearing, but it can consist of other types of bearings known in the art. The second end 68 of the socket 64 is fitted around a wheel nut 84 of the transporter 56 such that the wheel nut 84 is inserted into the cavity 74 of the socket 64. The wheel nut 84 itself is fastened to a wheel hub 86. The bearing 76 is housed within the receptacle 30 of the connecting member 18 (see FIG. 5).

The adapter 10 is configured to accept a variety of accessories. By way of example, as shown in FIG. 6, the adapter 10 may accept a swivel arm 88 and associated video camera equipment 90 via the post 52 of the bracket 48 (not shown in FIG. 6). In this regard, the swivel arm 88 is connected rotatably to the post 52. The arrangement shown in the FIG. 6 enables a user to operate the video camera equipment 90 and the transporter 56 simultaneously. For example, the transporter 56 can travel forwards or backwards, or it can rotate 360 degrees. Thus, the adapter 10 enables a user to utilize the unique movement features of the transporter 56 to perform various camera movements known in the art, e.g., panning, tilting, tracking, trucking, etc. Also, the adapter 10 enables a videographer to utilize the transporter 56 and carry out these camera movements without the need for camera tracks and takes the burden off the back of the camera operator.

It is noted that the weight of the swivel arm 88 and the equipment 90 is distributed downwardly on the wheel 60 of the transporter 56. As a result, the well 32 of the connecting member 18 rests on the bearing 76, thereby preventing the bearing assembly 62 from disengaging the wheel nut 84 (see FIG. 5). While the transporter 56 is in motion, the rotation of the wheel nut 84 causes the socket 64 to rotate. The bearing 76 allows the socket 64 to rotate freely while the connecting member 18 is engaged with the bearing assembly 62.

As indicated above, the adapter 10 may be configured to accept a wide-variety of accessories, for instance, a basket or other types of containers, sporting equipment such as golf bags and hunting rifle mounts, etc. (not shown in the Figures). In addition, two of the adapters 10 may be used simultaneously with the transporter 56 so as to accept further types of accessories, such as rain and snow covers (not shown in the Figures).

Specifically, the adapter 10 has been sized and shaped for use with the SEGWAY® brand of motorized personal transporters. However, the adapter 10 can be utilized with other brands of motorized personal transporters and other transportation devices.

Figure 7:
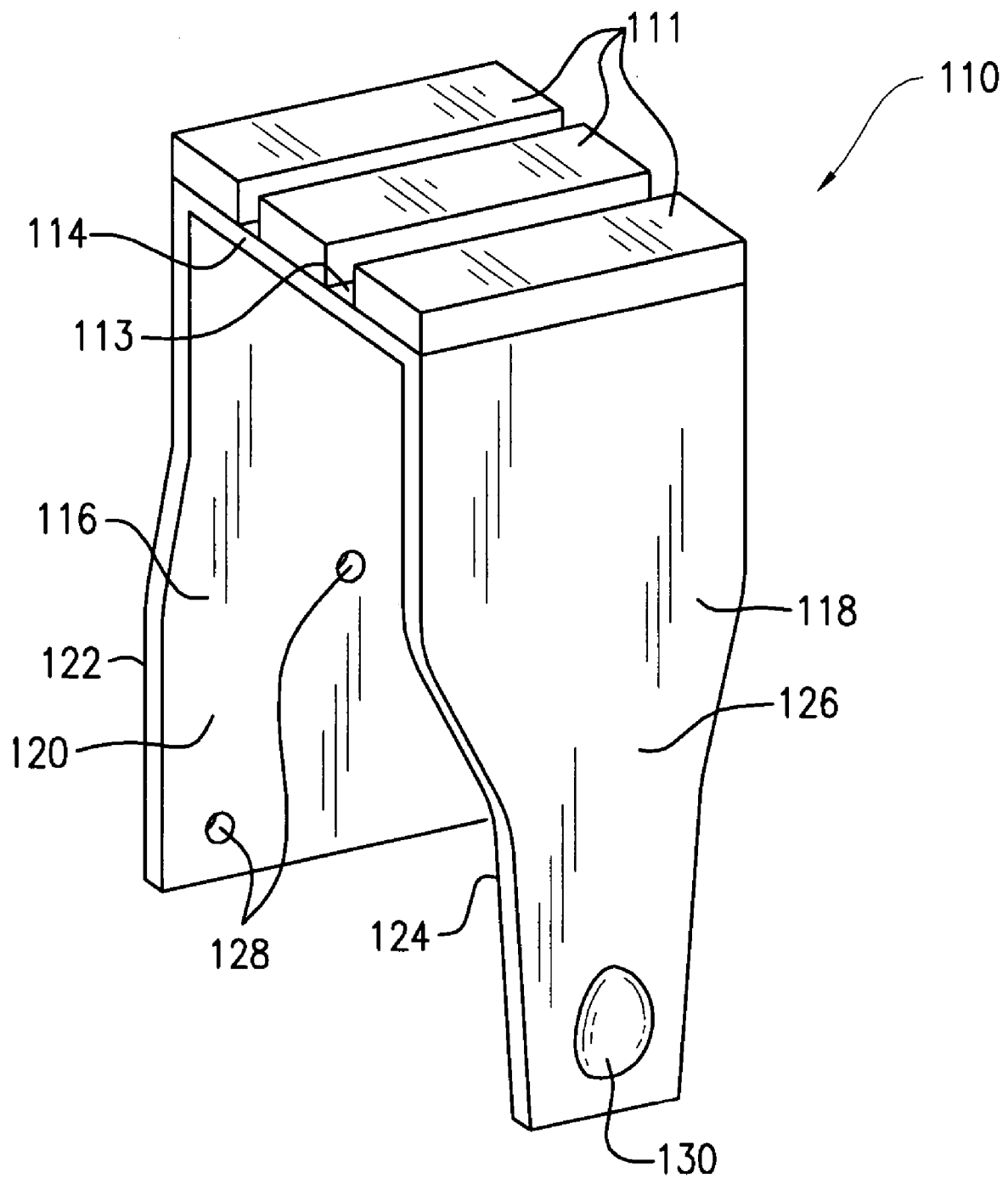
FIG. 7 is a rear perspective view of an accessory adapter constructed in accordance with a second exemplary embodiment of the present invention.

Another exemplary embodiment of the present invention is illustrated in FIG. 7. Elements illustrated in FIG. 7 that correspond to the elements described above with reference to FIGS. 1 and 2 have been designated by corresponding reference numerals increased by one hundred (100). The embodiment of FIG. 7 operates in the same manner as the embodiment of FIGS. 1 and 2, unless it is otherwise stated.

Referring to FIG. 7, an accessory adapter 110 includes a bracket 112 having a square-shaped base 114 and a pair of connecting members 116, 118 that extend from the base 114 in a longitudinal direction and parallel to each other. The base 114 and the connecting members 116, 118 cooperate to form a U-shape. The connecting member 116 has an inboard side 120 and an outboard side 122 opposite the inboard side 120. Similarly, the connecting member 118 has an inboard side 124 and an outboard side 126 opposite the inboard side 124. The connecting member 116 includes a plurality of holes 128 each of which extend from the inboard side 120 to the outboard side 122 thereof. The holes 128 are arranged in a triangular pattern (see FIG. 7). The connecting member 118 includes circular-shaped, concave cavity 130 formed within the inboard side 124 thereof and a tubular-shaped well 132 that extends around the periphery of the cavity 130 on the inboard side 124 (not shown in the Figures).

Still referring to FIG. 7, a plurality of blocks 111 extend across an upper surface 113 of the base 114 with grooves 115 formed therebetween. The blocks 111 are, preferably, connected to the base 114 by welding, but they may be connected to the base 114 by other attachment means, such as adhesives, bolts, rivets, screws and other fasteners. Alternatively, the blocks 111 and the base 114 may be of unitary construction.

The embodiment of FIG. 7 operates in the same manner as the embodiment of FIGS. 1 and 2 with one difference. That is, the base 114 is configured to receive accessories different from those received by the support member 34 adapter 10. For instance, objects such as video camera batteries, bags, and monitors can be placed on or mounted to the base 114. These accessories may be secured in place with one or more retaining straps or other retaining means (not shown in the Figures).

It will be understood that the embodiments of the present invention described herein are merely exemplary and that a person skilled in the art may make many variations and modifications without departing from the spirit and the scope of the present invention. All such variations and modifications are intended to be included within the scope of the invention as defined in the appended claims.

What is claimed is:

1. An accessory adapter for a two-wheeled motorized, self-balancing personal transporter having two diametrically opposed wheel assemblies, the adapter comprising a U-shaped bracket having a base, a first support member extending from said base and having a free end releasably fastened to an inboard side of one of the wheel assemblies of the transporter, and a second support member extending from said base in the same direction as said first support member, said second support member having an inboard side and a free end engaged with an outboard side of the wheel assembly, said second support member including a well formed on said inboard side and proximate to said free end of said second support member, said first and second support members being generally parallel to one another and positioned substantially vertical when engaged with the wheel assembly; a bearing assembly which includes a shaft having a first end and a second end opposite thereof, and a bearing, said first end of said shaft being fastened rotatably to a wheel of the wheel assembly, and said bearing being attached to said second end of said shaft, said shaft being freely rotatable relative to said bearing, said bearing is positioned within said well of said second support member of said bracket; and a Y-shaped third support member having an elongated neck and a pair of prongs extending therefrom, one of said prongs being fastened to said first support member and the other of said prongs being fastened to said second support member, said neck of said third support member includes a plurality of apertures that are sized and shaped to receive an accessory, said bearing assembly enables the wheel of the wheel assembly to freely rotate when said well of said second support member engages said bearing caused by the weight of the accessory when it is mounted to said third support member.

2. A method of filming with video equipment, comprising the steps of:
providing a two-wheeled, motorized, self-balancing personal transporter having two diametrically opposed wheel assemblies for transporting an operator;
providing an adapter for mounting the video equipment to the transporter, said adapter comprising a U-shaped bracket having a base, a first support member extending from said base and having a free end releasably fastened to an inboard side of one of the wheel assemblies of the transporter, and a second support member extending from said base in the same direction as said first support member, said second support member having an inboard side and a free end engaged with an outboard side of the wheel assembly, said second support member including a well formed on said inboard side and proximate to said free end of said second support member, said first and second support members being generally parallel to one another and positioned substantially vertical when engaged with the wheel assembly; a bearing assembly which includes a shaft having a first end and a second end opposite thereof, and a bearing, said first end of said shaft being fastened rotatably to a wheel of the wheel assembly, and said bearing being attached to said second end of said shaft, said shaft being freely rotatable relative to said bearing, said bearing is positioned within said well of said second support member of said bracket; and a Y-shaped third support member having an elongated neck and a pair of prongs extending therefrom, one of said prongs being fastened to said first support member and the other of said prongs being fastened to said second support member, said neck of said third support member includes a plurality of apertures that are sized and shaped to receive an accessory, said bearing assembly enables the wheel of the wheel assembly to freely rotate when said well of said second support member engages said bearing caused by the weight of the accessory when it is mounted to said third support member;
mounting the video equipment to the transporter by said adapter; and
operating simultaneously the transporter and the video equipment by the operator.

* * * * *